United States Patent Office 2,697,735
Patented Dec. 21, 1954

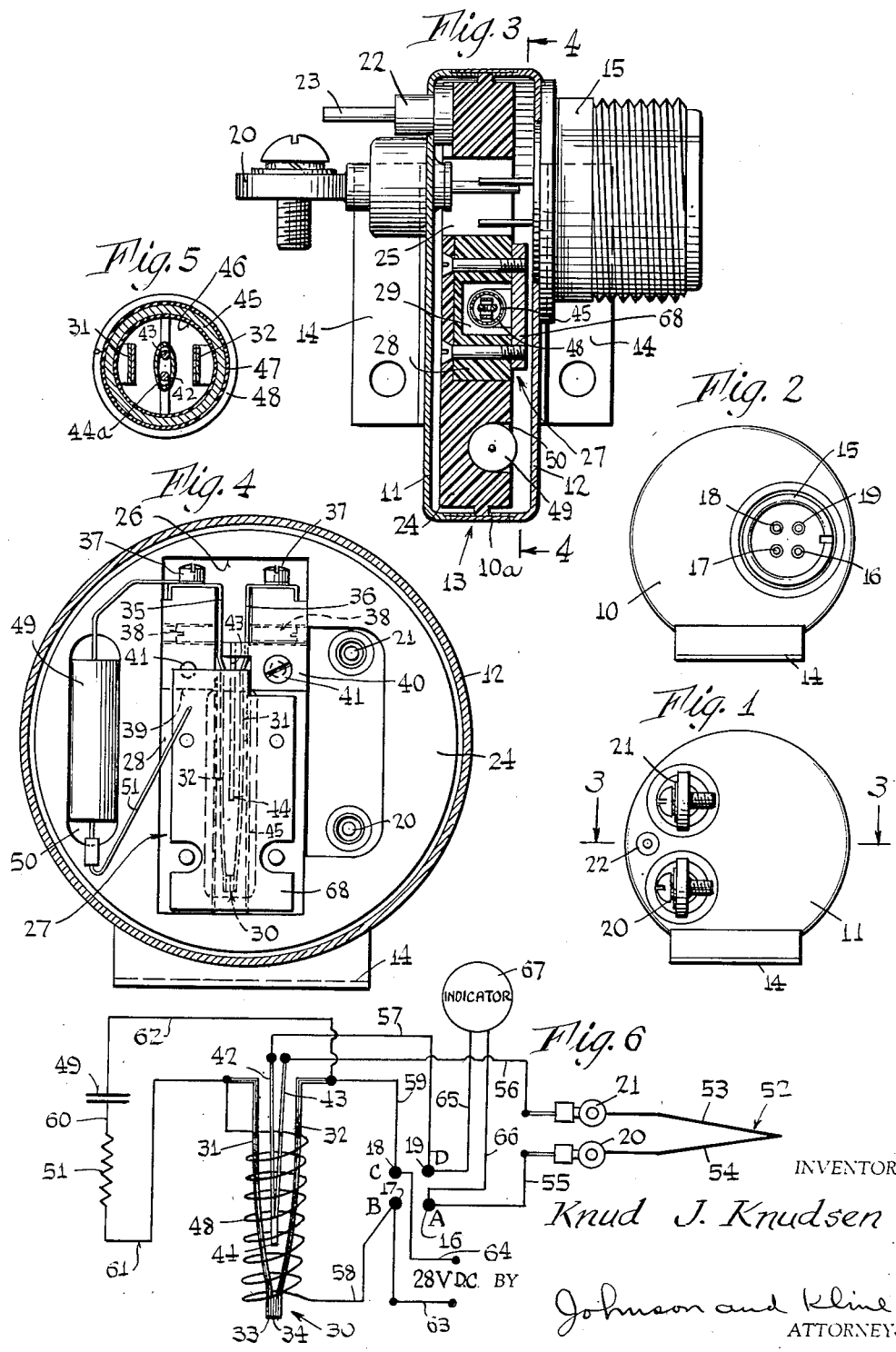

2,697,735

TEMPERATURE-CONTROLLED THERMOCOUPLE COLD JUNCTION

Knud J. Knudsen, Naugatuck, Conn., assignor to The Lewis Engineering Company, Naugatuck, Conn., a corporation of Connecticut Application June 1, 1953, Serial No. 358,679

13 Claims. (Cl. 136—4)

This invention relates to heat-responsive devices employing thermocouples, as for the purpose of measuring temperatures or controlling apparatus in response to fluctuations of temperature.

An object of the invention is to provide an improved temperature-responsive device having a thermocouple, such as an indicator or control, wherein a high degree of accuracy is obtained.

Another object of the invention is to provide an improved temperature-responsive device employing a thermocouple, in which changes in ambient temperature are substantially negligible in affecting the accuracy and reliability of the device.

A further object if the invention is to provide an improved temperature-indicating device employing a thermocouple, in which a great degree of accuracy is obtainable, and at relatively low cost, even though the indicator is located quite remote from the thermocouple.

Yet another object of the invention is to provide an improved temperature-indicating device employing a thermocouple, wherein an indicator not provided with ambient temperature cold-junction compensation may be used and the device still produce accurate temperature readings.

Still another object of the invention is to provide, as a new article of manufacture, a temperature-controlled cold junction unit for use with a thermocouple, which unit is simple, reliable in its operation and economical to fabricate.

Features of the invention reside in the provision of an improved temperature-controlled cold junction unit for use with a thermocouple, wherein the effects of changes in ambient temperature are minimized, wherein the temperature at which the cold junction is maintained is held within very narrow limits over a wide range of ambient temperatures, wherein only relatively little power is required for its operation, and wherein a rapid response of the temperature control for the cold junction is had to heating current supplied to the device.

Other features and advantages will hereinafter appear.

In the accompanying drawings:

Figure 1 is a front elevational view of a temperature-controlled cold junction unit made in accordance with the invention.

Fig. 2 is a rear elevational view of the unit shown in Fig. 1.

Fig. 3 is a view partly in plan and partly in horizontal section, taken on line 3—3 of Fig. 1.

Fig. 4 is a vertical sectional view taken on line 4—4 of Fig. 3.

Fig. 5 is a fragmentary horizontal sectional view of the heating coil, thermostatic switch and cold junction wires of the device.

Fig. 6 is a schematic diagram of a temperature-responsive system made in accordance with the invention.

Referring to Figs. 1 through 4 the improved temperature-controlled cold junction unit of this invention comprises a wafer-like casing 10 of cylindrical shape having a short axial length, said casing being formed of two halves 11 and 12 telescoping into a continuous band 10a as indicated at 13, the entire assembly being hermetically fastened together and sealed as by soldering. The casing 10 is provided with apertured mounting flanges 14 by which it may be secured to a supporting structure.

The casing half 12 has secured to it a connector fitting including a tubular, externally-threaded shell 15 which is hermetically sealed to the casing half, and including terminals 16, 17, 18 and 19 within the shell, extending into the casing 10 and also hermetically sealed thereto.

The casing half 11 has a pair of terminals 20 and 21 secured and hermetically sealed to it, the terminal 20 preferably being of Chromel and the terminal 21 of Alumel for purposes to be later brought out. Also secured and hermetically sealed to the casing half 11 is a bushing 22 provided with a filler tube 23 by which air may be evacuated from the casing 10 and the casing filled with a suitable inert gas.

Within the casing 10 there is mounted a relatively thick disk 24 of electrically insulating material, having an opening 25, Fig. 3, to provide clearance for the inner ends of the terminals 16 through 21. The disk 24 also has a rectangular recess 26 to accommodate an assembly 27 comprising a cold junction, a heater for the cold junction and a thermostatic control for the heater, all now to be described.

The assembly 27, Figs. 3 and 4, comprises a rectangular block 28 of insulating material having a longitudinally extending recess 29 along its central axis and open at one face of the block. Secured in the recess 29 is a thermostatic switch 30 comprising a pair of bimetallic arms 31 and 32 provided with cooperable contacts 33 and 34, the arms 31 and 32 being attached to mounting brackets 35 and 36 respectively, fastened by screws 37 to the block 28. Preferably the brackets 35 and 36 are made of a spring material such as beryllium copper, and adjustment of the bimetallic arms is provided by means of adjusting screws 38, Fig. 4, threaded into the block 28.

Attached to opposite sides of the block 28 are terminal plates 39 and 40, said plates being secured by screws 41 and mounting cold-junction thermocouple wires 42 and 43 of Alumel and Chromel respectively, Figs. 4 and 6, said wires being joined at their extremities 44 and being disposed between the bimetallic arms 31 and 32. A paper sleeve 44a surrounds the wires 42 and 43.

Surrounding the bimetallic arms 31 and 32 there is a metal tube 45, Fig. 5, forming a coil support, said tube being preferably of nickel and provided on its inside with a coating 46 of electrically insulating heat-resistant plastic such as Teflon. The exterior of the tube 45 is also provided with a Teflon coating 47 and an electric heating coil 48, preferably of nickel wire, is wound on the exterior of the tube 45.

The mechanical structure of the cold-junction unit also includes a capacitor 49 mounted in an elongate recess 50 in the disk 24, and a resistor comprising a wire 51 carried externally of the disk 24.

The circuit diagram of the temperature-responsive device of the present invention is shown in Fig. 6. A thermocouple 52, which may be formed of a Chromel element 53 and an Alumel element 54, is connected with the Chromel and Alumel terminals 20 and 21, the corresponding materials being joined together to avoid thermo-electric effects. The terminal 20 is connected by an Alumel wire 55 to the terminal 16, which latter is preferably of copper. The terminal 21 is connected by a Chromel wire 56 to the Chromel element 43 of the cold junction 44, and the element 42 of the cold junction is connected by an Alumel wire 57 with the terminal 19.

The terminal 17 is connected by a wire 58 with the heating coil 48, which is in turn connected to the bimetallic arm 31. The bimetallic arm 32 is connected by a wire 59 with the terminal 18.

The condenser 49 is connected by a wire 60 to the resistor 51, which is in turn connected by a wire 61 with the bimetallic arm 31. The condenser is connected by a wire 62 to the bimetallic arm 32. All of the circuits and components described immediately above, with the exception of the thermocouple 52 and thermocouple elements 53 and 54, are located either within or on the casing 10. The thermocouple 52 may be located a distance away from the casing 10, keeping in mind that the leads from the thermocouple to the terminals 20 and 21 should be as short as possible.

Energization of the heating coil 48 is provided by leads 63 and 64 from the terminals 17 and 18, said leads, for example, being energized from a 28-volt D. C. supply.

The terminals 16 and 19 are connected by copper wires 65 and 66 to an indicator 67 which is not cold-junction compensated.

Operation of the improved temperature-responsive device of my invention is as follows. By suitable adjustment of the adjusting screws 38 which regulate the tension of the bimetallic arms 31 and 32, Fig. 4, the temperature within the casing 10 may be maintained at approximately 110° C., within limits of plus or minus two degrees for outside temperatures from a minimum of 55° C. to a maximum of 110° C. Whenever the temperature within the casing 10 falls below 110° C., the bimetallic arms 31 and 32 move together, and close the circuit, energizing the heating coil 48. When the temperature in the casing rises sufficiently the bimetallic arms 31 and 32 will flex to separate the contacts 33, 34, thereby de-energizing the heating coil 48. Thus the temperature within the casing 10 is maintained at a substantially constant figure.

By the present invention I locate the cold junction 44 and the bimetallic arms 31 and 32 within the nickel tube 45 whereby they are closely juxtaposed and readily influenced by the heating coil 48. The assembly of the heating coil, bimetallic arms and cold junction thermocouple, by being disposed within the recess 29 in the block 28, is further protected from changes in the temperature of the casing walls and I provide a closure strip 68 of insulation, to cover most of the recess 29 to further minimize the effect of changes in the temperature of the casing walls. The block 28 and closure strip 68 therefor constitute a housing within the casing 10, which confines the assembly of the heating coil, thermostatic switch and cold junction, resulting in the latter being maintained within close limits of temperature.

Since the cold junction 44 is therefore maintained always at 110° C. (or another uniformly held temperature as determined by the setting of the adjustment screws 38) changes in ambient temperature surrounding the casing 10 will not affect the accuracy of the reading of the indicator 67 as the latter responds to temperature fluctuations of the thermocouple 52.

I construct the bimetallic arms 31 and 32 and the contacts 33 and 34 thereof to have exactly equal masses whereby vibration or movement to which the casing 10 may be subjected will not materially affect the functioning of the thermostatic switch.

The cold junction unit of the present invention, by being completely hermetically sealed and by having the working parts surrounded by an inert gas, is extremely reliable in its functioning, making for a desirable overall accuracy of the temperature indicator depicted by the circuit of Fig. 6.

Variations and modifications may be made within the scope of the claims and portions of the improvements may be used without others.

I claim:

1. A temperature-responsive device comprising a thermocouple having a cold junction remote from the hot junction and independent of heating applied to the hot junction; electric-heating means surrounding the cold junction for heating the latter; and means disposed between the cold junction and heating means and controlling said heating means to maintain the cold junction at a predetermined uniform temperature.

2. The invention as defined in claim 1, in which the means controlling the heating means comprises a thermostatic switch connected in the heater circuit, and in which there is a casing surrounding and isolating the cold junction, heater, and switch.

3. The invention as defined in claim 1 in which the heating means comprises an elongate, helical electric heating coil, in which the cold junction is disposed within said coil, and in which the means controlling the heating means comprises bimetallic switch arms disposed within the heating coil and interposed between the latter and the cold junction.

4. A temperature-responsive device comprising a thermocouple having a cold junction remote from the hot junction and independent of heating applied to the hot junction; a casing surrounding and isolating the cold junction from the hot junction; means in said casing for heating the cold junction comprising an electric heating coil of nickel wire; a nickel tube in said casing, carrying said heating coil; a coating of electrically insulating high-temperature resistant plastic, interposed between the heating coil and the nickel tube and adhered to the tube; and means controlling said heating coil to maintain the cold junction at a predetermined uniform temperature, comprising a thermostatic switch disposed in said casing in heat-receiving relation with and connected in the circuit of the heating coil.

5. The invention as defined in claim 4 in which the inside of the nickel tube is coated with electrically insulating high-temperature resistant plastic, and in which the thermostatic switch is disposed within the nickel tube and comprises bimetallic arms flexing toward and away from each other in response to lower and higher temperatures respectively, said arms extending substantially along the length of said tube.

6. The invention as defined in claim 5 in which the cold junction is disposed within the nickel tube and extends between the bimetallic arms in close proximity thereto.

7. A temperature-responsive device comprising a thermocouple having a cold junction remote from the hot junction and independent of heating applied to the hot junction; a casing surrounding and isolating the cold junction from the hot junction; means in said casing for heating the cold junction; means controlling said heating means to maintain the cold junction at a predetermined uniform temperature comprising a thermostatic switch disposed in said casing in heat-receiving relation with the heating means, said switch having a pair of coextensive, bimetallic arms provided with contact points for coengagement, the mass of one bimetallic arm and its contact point being equal to the mass of the other bimetallic arm and its contact point, thereby to minimize the effect of vibration or movement to which the switch may be subjected.

8. As a new article of manufacture, a uniform-temperature cold junction device for use with a thermocouple, comprising a casing; current-supply terminals on the casing; a heater in the casing, connected with said current-supply terminals; heat-responsive means in the casing, controlling the circuit of the heater to maintain a uniform temperature in the casing; a cold-junction thermocouple in the casing, arranged to be influenced by the temperature therein; a pair of terminals on the casing for connection to an indicator, one of said pair of terminals being joined to said cold junction; and a second pair of terminals on the casing, formed of the same materials as the cold junction, one of said second pair of terminals being joined to said cold junction and the other being joined to the other of said first pair of terminals.

9. The invention as defined in claim 8 in which the heat-responsive means comprises a thermostatic switch and in which there are a capacitor and a series-connected resistor disposed within the casing, bridging said thermostatic switch.

10. The invention as defined in claim 8 in which the heater comprises an electric heating coil, in which there is a metal tube on which the heating coil is wound and from which it is insulated, in which the heat-responsive means comprises a thermostatic switch disposed within the metal tube, and in which the cold junction is disposed within the tube in close proximity to the thermostatic switch.

11. The invention as defined in claim 10 in which the thermostatic switch comprises a pair of bimetallic arms interposed between the cold junction and the metal tube on which the heating coil is wound.

12. The invention as defined in claim 8 in which the casing comprises a hermetically-sealed metal shell and in which all of the said terminals are carried by the shell and hermetically sealed thereto, the casing being airtight whereby outside currents of air are prevented from entering the casing and quickly materially altering the temperature of the cold junction.

13. The invention as defined in claim 8 in which there is a heat-insulating housing disposed within the casing, said housing enclosing the heater, the heat-responsive means and the cold junction and minimizing the effect of temperature changes of the casing on said heater, heat-responsive means and cold junction.

References Cited in the file of this patent

UNITED STATES PATENTS

| Number | Name | Date |
| --- | --- | --- |
| 2,312,022 | Brooks | Feb. 23, 1943 |
| 2,463,944 | Borden | Mar. 8, 1949 |